UNITED STATES PATENT OFFICE.

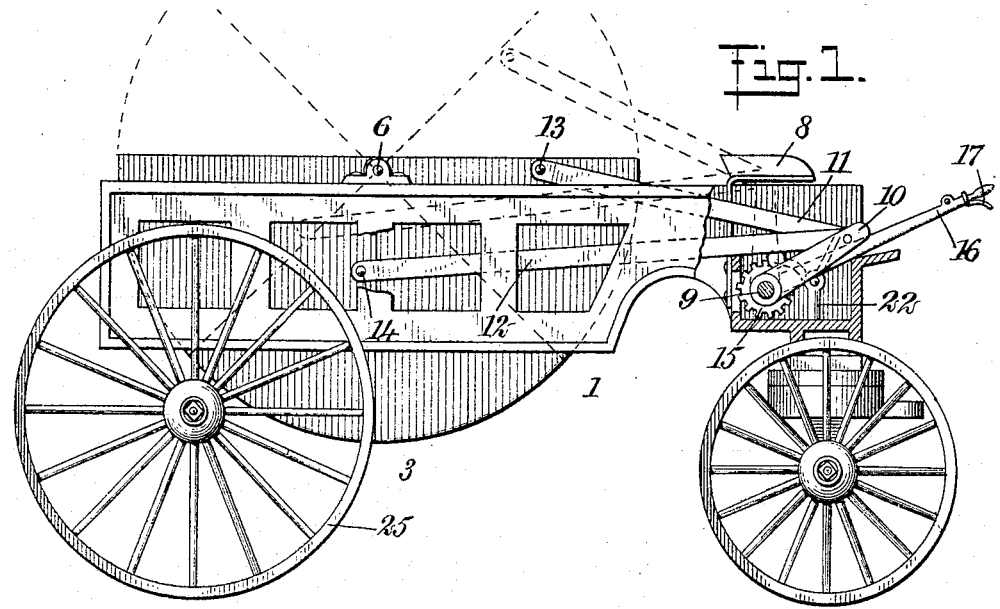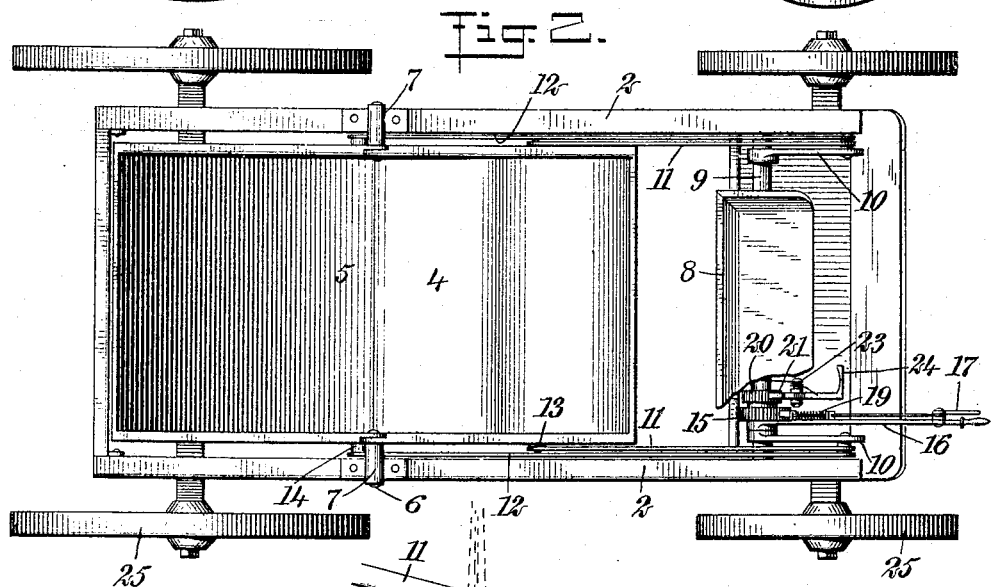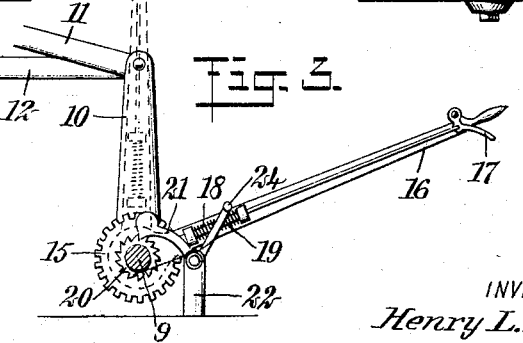

HENRY L. HAZEN, OF EDGEWATER, NEW JERSEY.

DUMPING-WAGON.

939,130.  Specification of Letters Patent.  Patented Nov. 2, 1909.

Application filed July 29, 1908. Serial No. 445,913.

*To all whom it may concern:*

Be it known that I, HENRY L. HAZEN, a citizen of the United States, and a resident of Edgewater, in the county of Bergen and State of New Jersey, have invented a new and Improved Dumping-Wagon, of which the following is a full, clear, and exact description.

This invention relates to dumping wagons. An object of the invention is to produce a dumping wagon of simple construction which can be readily operated to dump its load, and which is constructed in such a manner that when the load is dumped the load will not interfere with the removal of the wagon.

A further object of the invention is to provide a construction which is extremely simple and readily operated from the driver's seat.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a dumping wagon constructed according to my invention, the forward portion of the body of the wagon being broken away and shown in cross section; Fig. 2 is a plan; and Fig. 3 is a vertical section taken through the main shaft or rock shaft which controls the dumping of the wagon, the lever mechanism being shown in elevation.

Referring more particularly to the parts, 1 represents the frame of the wagon which is substantially rectangular in form, having sides 2, between which the body 3 of the wagon is supported. This body is of semicylindrical form and is constructed in two sections 4 and 5 which meet in a vertical plane, passing through the trunnions 6 which support the body from the sides 2, as indicated, suitable bearing brackets 7 being employed for this purpose.

The forward part of the wagon frame 1 is provided with a seat 8 for the driver, and at a suitable point under this seat, a transverse rock shaft 9 is mounted. Near its ends this rock shaft is provided with rigid arms 10 and to the outer ends of these arms 10, links 11 and 12 are attached. The links 11 extend upwardly and rearwardly and are rigidly attached by pivot bolts or rivets 13 to the sides of the forward section 4 of the wagon body; the links 12 extend rearwardly and downwardly and are attached by pivot bolts or rivets 14 to the sides of the rear section 5 of the body of the wagon. The arms 10 normally project forwardly and upwardly in an inclined position, as indicated in Fig. 1. On the rock shaft there is rigidly mounted near the right side of the wagon, a gear wheel 15, and adjacent to this gear wheel there is loosely mounted on the shaft an operating lever 16. This operating lever 16 has a finger lever 17 which operates a locking bolt 18, said locking bolt 18 being normally pressed by a spring 19 into engagement with the teeth of the gear wheel 15. By pressing the finger lever 17 the bolt 18 can be withdrawn from engagement with the gear wheel 15 so as to permit the free movement of the lever 16, as will be readily understood.

At a suitable point near the right side of the wagon, I provide the rock shaft 9 with a ratchet wheel 20, the teeth of which project forwardly, as indicated in Fig. 3. Adjacent to this ratchet wheel I provide a pawl 21 which engages with the teeth in order to hold the shaft against rotation. This pawl 21 is mounted on a suitable post 22, in connection with which a spring 23 is provided, which tends to hold the pawl in engagement with the ratchet wheel, as will be readily understood. The pawl 21 is provided with a treadle arm 24, which is adapted to be pressed by the driver's foot so as to disengage the pawl from the ratchet wheel when desired.

The wagon is mounted upon wheels 25 in the usual manner. In Fig. 1 the wagon body is shown in its closed position, that is, in the position which it has when carrying a load. When it is desired to dump the load the lever 16 is pulled upwardly from its forwardly projecting position so as to rotate the shaft 9 in a left-hand direction. This rocks the arms 10 toward the body and exerts a thrust on the links 11 and 12, the links 11 being attached so that this thrust is exerted in a line passing above the trunnions 6, while the links 12 are attached so that the thrust is exerted below the trunnions 6. The thrusts on the links therefore open the body by rotating the sections 4 and 5 in opposite directions, as indicated by the dotted lines in Fig. 1. As the shaft 9 rotates, the pawl 21 coöperates with the ratchet wheel 20 so as to lock the shaft in any position in which it is left, but when it is desired to free the shaft so as to permit the body sections 4 and 5 to return by gravity to their normal closed position, it is only necessary to operate the treadle 24. If it is not desired to dump the load all in one spot, but to distribute it, the body sections 4 and 5 may be left in a partially open position, and the wagon may then be driven along until the load has fallen through the space between the sections 4 and 5.

The form of body described is highly advantageous, as it enables the frame of the wagon to be shortened, and furthermore, on account of the fact that the bottom of the body rises when the load is dumped, the wagon body will readily clear the load after it is dumped.

Attention is called to the fact that the links 11 and 12 form an angle with each other, and the pivot or trunnion 6 lies in this angle. In this way, although the links have a common point of attachment to the arm 10, the link 11 exerts an upward thrust on the forward section of the body so that the thrust line passes above the axis of rotation. The other link exerts a thrust in a line passing below the axis of rotation. On this account, although the links have the same point of attachment to the arm, and although the forward ends of the links move rearwardly in an opening movement, the links produce opposite rotations in the two sections of the body.

Having thus described my invention I claim as new and desire to secure by Letters Patent,—

1. In a dumping wagon, in combination, a frame, a body of substantially semi-cylindrical form comprising sections, a supporting pivot for said sections near the middle point of said frame and near the upper edges of said sections, the axis of said supporting pivot being disposed transversely to the longitudinal axis of said frame, a movable arm mounted on said frame, means for moving said arm, and links attached to said arm forming an angle with each other and attached respectively to said sections, said supporting pivot being disposed within said angle whereby the movement of said arm produces opposite rotations of said sections.

2. In a dumping wagon, in combination, a frame, a body of substantially semi-cylindrical form comprising sections, a supporting pivot for said sections disposed transversely to the axis of said frame, a rotatable arm, means for rotating said arm, and links having a common pivotal point on said arm forming an angle with each other and attached respectively to said body sections, said links affording means for rotating said body sections in opposite directions.

In testimony whereof I have signed my name to this specification in the presence of two subscribing witnesses.

HENRY L. HAZEN.

Witnesses:
WILLIAM BECKER,
JOHN W. GREER.